United States Patent [19]

Heinzl

[11] 4,367,482

[45] Jan. 4, 1983

[54] METHOD AND APPARATUS FOR REPRESENTING POLYCHROMATIC HALF-TONE IMAGES

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 293,235

[22] Filed: Aug. 17, 1981

[30] Foreign Application Priority Data

Oct. 6, 1980 [DE] Fed. Rep. of Germany ....... 3037774

[51] Int. Cl.³ .................... G01D 15/18; H04N 1/22
[52] U.S. Cl. .................... 346/140 R; 346/1.1; 358/298
[58] Field of Search ............... 346/1, 75, 140 PD; 358/78, 283, 298

[56] References Cited

U.S. PATENT DOCUMENTS

| | | | |
|---|---|---|---|
| B512,964 | 2/1976 | Wiesmuller et al. | 346/75 |
| 2,573,143 | 10/1951 | Jacob | 346/75 UX |
| 3,604,846 | 9/1971 | Behane et al. | 358/78 X |
| 3,747,120 | 7/1973 | Stemme | 346/75 |
| 3,977,007 | 8/1976 | Berry et al. | 358/283 X |
| 4,032,978 | 6/1977 | Wong | 358/298 X |
| 4,112,469 | 9/1978 | Paranjpe et al. | 346/75 X |
| 4,320,406 | 3/1982 | Heinzl | 346/140 PD |

FOREIGN PATENT DOCUMENTS 2008890 6/1979 Fed. Rep. of Germany ...... 346/140 PD

*Primary Examiner*—George H. Miller, Jr.
*Attorney, Agent, or Firm*—Hill, Van Santen, Steadman, Chiara & Simpson

[57] ABSTRACT

A method and apparatus for representing polychromatic half-tone images employs the formation of image spots of equal size. The image spots each contain different colored image points, also of equal size, whose number determines the respective degree of coverage of one primary color. The raster positions at which the image points can be printed within the image spots are disposed in such a manner that each raster point has the same spacing from six adjacent raster points. The sequence by which the raster points are occupied in the image spots during the process of an increasing degree of coverage is fixed such that upon increasing degrees of coverage of all of the primary colors, the image points are first represented next to one another and are only printed on top of one another after the occupation of all raster positions.

8 Claims, 14 Drawing Figures

METHOD AND APPARATUS FOR REPRESENTING POLYCHROMATIC HALF-TONE IMAGES

BACKGROUND OF THE INVENTION

The present invention relates to a method and apparatus for printing polychromatic half-tone images by the employment of image points for different primary colors which are disposed at prescribed raster positions.

It is generally known to represent half-tone images consisting of image points with varying primary colors and varying size. As a function of the degree of coverage of the particular primary color, the size of the image points is changed. Such a manner of representing half-tone images is known, for example, from conventional matrix printing devices.

If the half-tone images are to be represented with image points of constant size, the conventional matrix printing methods and apparatus cannot be employed. The generation of polychromatic image points, for example, with an ink printing device was proposed in German patent application P 29 25 812.6 (not laid open). This ink printing device contains an ink printing head with a plurality of nozzles of which selected nozzles eject ink droplets of different colors.

SUMMARY OF THE INVENTION

It is an object of the present invention to provide a method and apparatus for representing polychromatic half-tone images by the use of image points of uniform size.

The above object is inventively achieved in a method and apparatus in which a prescribed plurality of raster positions is combined to form an image spot. The image spot is formed from a plurality of image points of identical size which plurality of image points fixes the respective degree of coverage of the corresponding primary color. The sequence with which the raster positions within the image spots are occupied by the image points, given an increasing degree of coverage, remains the same for each primary color and differs only from primary color to primary color.

The invention employs the concept of occupying as many raster positions as possible within the image spots, even given low degrees of coverage of the primary colors, in order to reduce the effect of the color of the recording medium, which is usually white. By means of the sequence with which the raster positions are occupied by the image points, which varies from primary color to primary color, the color effect is generated according to an optical mixture with generally low degrees of coverage, and is not generated according to a subtractive mixture until higher degrees of coverage are achieved. The half-tone images generated in this manner exhibit a significantly improved image quality and the formation of moire patterns is substantially avoided.

A particularly good image quality is achieved when the sequence with which the raster positions are occupied by the image points is fixed in such a manner that, given a uniformly increasing degree of coverage for all primary colors, the individual raster positions are only occupied by n image points after all raster positions were previously occupied by n−1 raster points, where n=2, 3, . . . .

Furthermore, a particularly good image quality and avoidance of moire patterns is achieved when the raster positions are disposed such that each raster position has the same spacing from six adjacent raster positions.

Given an increasing degree of coverage of each primary color, it is preferable to determine the respective raster positions within the primary sequence by means of polygons shifted inside one another, the polygons being successively completed upon the increasing degree of coverage of each primary color by occupation of the respective corner points of the polygons in a different sequence which varies from primary color to primary color.

If each image spot, for example, contains nine raster positions for the image points, which raster positions are disposed at the corner points of three triangles shifted with respect to one another that with increasing degrees of coverage of the primary colors each triangle is successively completed by occupation of its respective corner points.

It is preferable for printing standard, polychromatic half-tone images to employ a trichromatic printing method and apparatus, wherein the image points exhibit the primary colors magneta, yellow and cyan blue.

It is also within the concept of the invention disclosed herein to represent the half-tone images with a four color printing method and apparatus, wherein the image points exhibit the primary colors magneta, yellow, cyan blue, as well as black.

An apparatus for implementing the above method employs an ink printing head with a plurality of nozzles from which ink droplets representing the image points are ejected onto a recording medium. After each complete motion of the ink printing head in the printing direction the recording medium is shifted by a segment perpendicular to the printing direction, the segment being allocated to the plurality of nozzles which are adjacent to one another and above one another.

In an ink printing head having 12 nozzles, it is preferable that three groups of four nozzles disposed above one another and adjacent to each other respectively eject the ink droplets with the primary colors magenta, yellow and cyan blue. In the method of representing half-tone images employing four color printing, it is preferable that four groups of three nozzles be disposed above and adjacent to each other for respectively ejecting ink droplets with the primary colors magenta, yellow, cyan blue and black.

DESCRIPTION OF THE PREFERRED EMBODIMENTS

Figure 1:
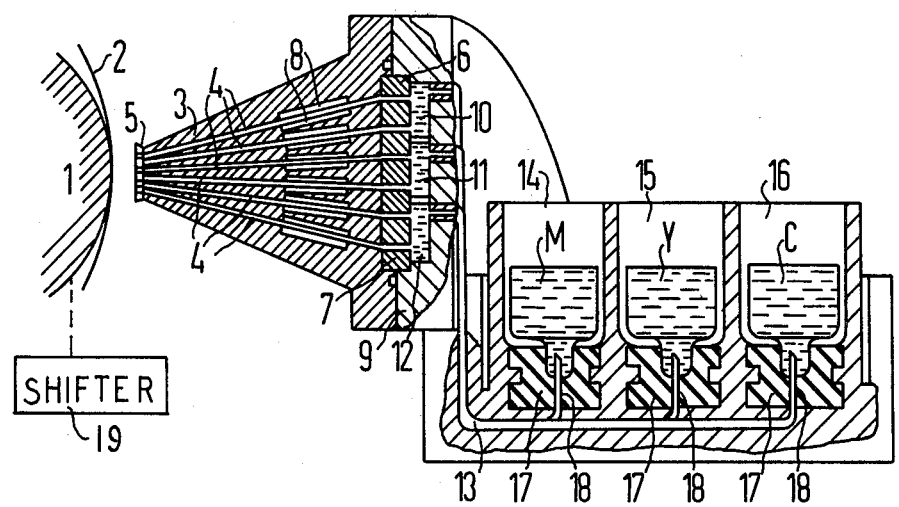
FIG. 1 is a sectional view of a mosaic ink printing device for printing polychromatic half-tone images constructed in accordance with the principles of the present invention.

An ink printing device is shown in FIG. 1 which may be disposed at the carriage of a conventional printing station, in place of an ink printing device which normally prints alpha-numeric characters. As in the conventional printing station, the ink printing head of the device shown in FIG. 1 moves along a platen 1 in order to print on a recording medium 2 placed around the platen. In contrast to conventional printing heads with which alpha-numeric characters are printed in one color, such as black, the printing device shown prints both alpha-numeric characters as well as graphic patterns and half-tone images on the medium 2, all of which can be represented polychromatically on the recording medium.

The ink printing head consists of a first portion 3 which contains a plurality of nozzle channels 4. In the exemplary embodiment shown in FIG. 1 the ink printing head contains 12 such nozzle channels, which are disposed in separate planes each containing four channels, one plane being illustrated in FIG. 1. The nozzle channels 4 are radially disposed. At one end of the channels, a nozzle plate 5 is disposed which contains all 12 nozzles and from which ink droplets are ejected in parallel paths onto the recording medium 2. A distribution plate 6 having a corresponding plurality of narrow channels 5 is disposed at the opposite end of the nozzle channels 4. Each nozzle channel 4 is concentrically surrounded by a piezo-ceramic transducer 8. Upon the application of a voltage from a voltage source not illustrated to one or more of the transducers 8, the activated transducer contracts, thereby ejecting ink droplets from the corresponding nozzle through the nozzle plate 5.

The nozzle channels 4 are supplied with ink from respective supply reservoirs 10, 11 and 12 which are disposed in a second portion 9 of the recording head. The first and second portions 3 and 9 of the ink printing head may be formed of synthetic material. In the exemplary embodiment shown in FIG. 1 having 12 nozzles, and for the representation of half-tone images by means of three primary colors, the 12 nozzles are divided into three groups of four nozzles, the nozzles in each group being disposed above and adjacent to one another and all being supplied with the same color ink. The supply reservoirs 10, 11 and 12 are connected to respective ink containers 14, 15 and 16 via supply lines 13. The ink containers 14, 15 and 16 each have a rubber cap thereon which normally seals the container but which is pierced by a hollow needle 18 when the inverted ink container is placed in order to produce a connection to the ink printing head.

In the embodiment described below, the ink containers 14, 15 and 16 are filled with inks M, Y and C respectively representing the colors magenta, yellow and cyan blue. The ink M with the color magenta is supplied to the uppermost nozzles via the supply reservoir 10, whereas the ink Y with the color yellow is supplied to the central nozzles via the supply reservoir 11, and the ink C with the color cyan blue is supplied to the lowest nozzles via the supply reservoir 12. During the motion of the ink printing head along the platen 1, one line is printed on the recording medium, the line consisting of three partial lines with the colors magenta, yellow and cyan blue. After printing of the line, the recording medium 2 is shifted by the width of a partial line, so that the recording medium 2 can be printed at all locations with the colors magenta, yellow and cyan blue. By means of shifting the recording medium 2 by a respective partial line, it is not only possible to print the primary colors magenta, yellow and cyan blue on the recording medium 2, but it is also possible to represent colors derived in a known manner from mixture of these primary colors by means of multiple or overprinting. The recording medium 2 is shifted by a shift means 19 connected to the platen 1.

If, for the purpose of four-color printing, the color black is also to be additionally printed, a further ink container identical to the containers 14, 15 and 16 is required which contains black ink and which is similarly connected to a prescribed number of nozzles. If the exemplary embodiment of the printing head employing 12 nozzles is used, for example, the nozzles would be divided into four groups of three nozzles each, each nozzle in each group ejecting ink of the same color. In a corresponding manner, each partial line is formed by three nozzles, and each line is comprised of four partial lines.

Because the nozzles eject ink droplets of equal size, and the size of the ink droplets cannot be changed without substantial difficulty, polychromatic half-tone images are not represented by the use of the printing device in accord with matrix printing by means of image points of different size but rather are represented as pseudo-half-tone images by means of image points of the same size. The half-tone images are comprised of image spots of constant size. Each image spot contains an identical number of raster positions at which the image points of equal size can be printed.

Figure 2:
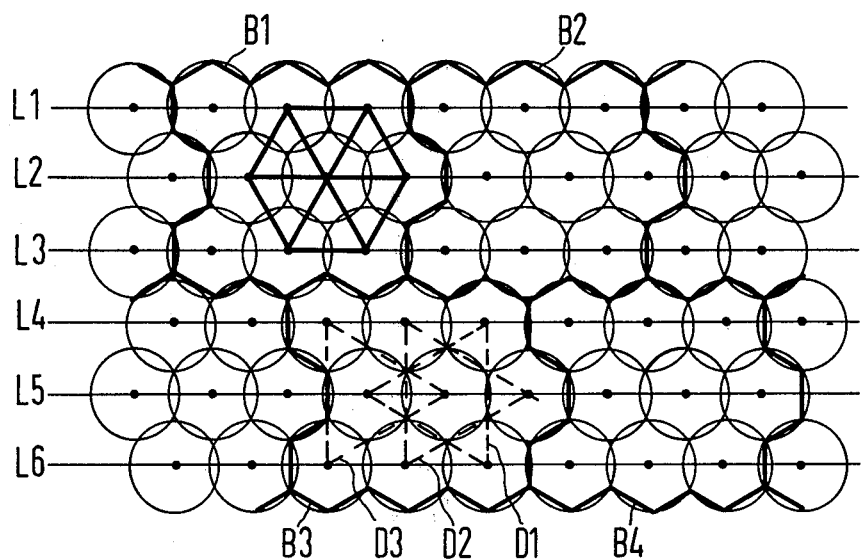
FIG. 2 is an illustration of image spots formed of image points in accordance with the apparatus of FIG. 1 and the method disclosed herein.

As shown in FIG. 2, nine respective raster positions are combined to form an image spot B. The raster positions are disposed on parallel lines L. The raster positions of each line L are shifted with respect to the raster positions of the two adjacent lines L by half of an image point division, so that each raster position, as represented by the image spot B, has the same spacing from six respective raster positions which are directly adjacent thereto. Similarly, the image spots B are offset by approximately one half of an image spot division in comparison to adjacent image spots B disposed above and below.

When printing on the recording medium 2 with the printing head shown in FIG. 1, the lines L1 through L4 are first printed with image points with the color, for example, cyan blue. After this printing operation, the recording medium 2 is shifted perpendicularly with respect to the printing direction for the lines L1 through L4. The lines L1 through L4 are next printed with image points with the color yellow during the next printing operation, whereas the lines L5 through L8 are simultaneously printed at the image points with the previous color cyan blue. After the end of this printing operation, the recording medium 2 is again shifted by four lines L and the lines L1 through L4 are now printed with image points with the color magenta, whereas the lines L5 through L8 are simultaneously printed with image points with the color yellow, and the lines L9 through L12 are simultaneously printed with image points with the color cyan blue. This operation is repeated until the corresponding image points have been printed at all desired locations on the recording medium 2.

For the representation of half-tone images, the degree of coverage of the respective colors due to the plurality of image points of the corresponding color in an image spot must be determined. The distribution of the image points in the image spots B, however, is not random but rather the occupation of the raster positions by the image points is undertaken in a prescribed sequence with an increasing degree of coverage. The image points are disposed at the corner points of three equilateral triangles D1, D2 and D3 which are shifted with respect to each other. With increasing degree of coverage, the corner points of the three triangles are successively occupied, whereby the occupation of a corner point of a new triangle is not begun until a triangle has been previously completed by occupying all of its corner points. For example, the corner points of the triangle D1 are first occupied, followed by occupation of the corner points of the triangle D2, and finally, the corner points of the triangle D3 are filled. The sequence is the same for all image spots B, so that an image point in one image spot B has the same spacing from corresponding image points in the six adjacent image spots B.

Figure 3A:
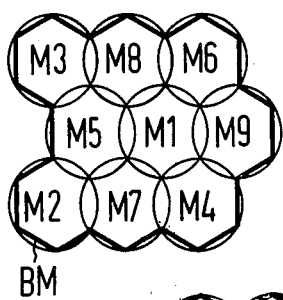
FIGS. 3a through 3c are illustrations of image spots formed of image points for the three primary colors in accordance with the principles of the present invention.
Figure 3B:
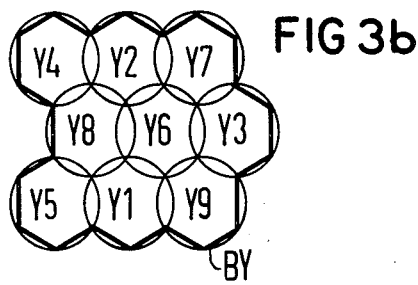
Figure 3C:
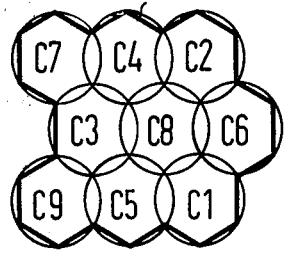
Figure 4A:
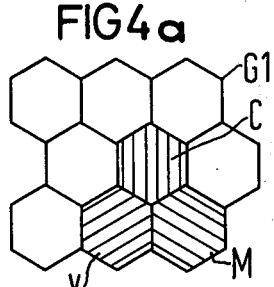
FIGS. 4a through 4i represent a distribution of vari-colored image points given uniformly increasing color coverage of all primary colors in accordance with the principles of the present invention.
Figure 4B:
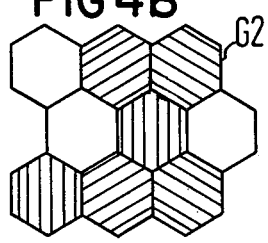
Figure 4C:
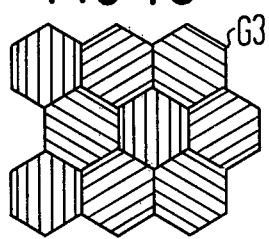
Figure 4D:
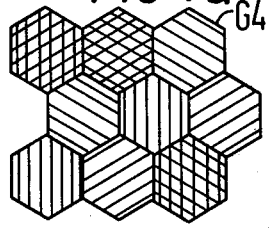
Figure 4E:
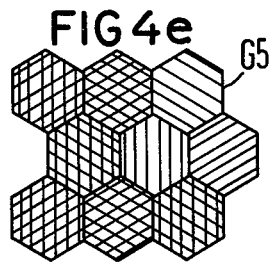
Figure 4F:
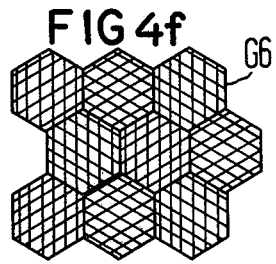
Figure 4G:
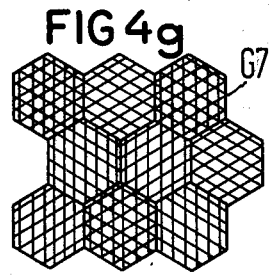
Figure 4H:
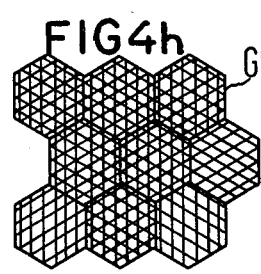
Figure 4I:
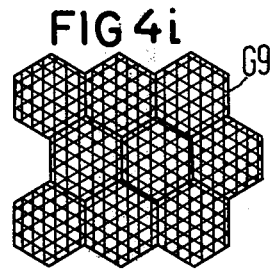

Image spots BM, BY and BC are respectively illustrated in FIGS. 3a, 3b and 3c with the colors magenta, yellow and cyan blue. The sequence for completing the image spots is illustrated by numbering the points in each spot respectively M1 through M9, Y1 through Y9, and C1 through C9. The spots are filled in numerical order of the identified image points. For example, for the image spot BM, the equilateral triangles are occupied in the sequence D1, D2 and D3, whereas, for the image spot BY, the triangles are occupied in the sequence D2, D3 and D1 and, for the image spot BC, the triangles are occupied in the sequence D3, D1, D2. By interchanging the triangle occupation sequence, for low degrees of coverage a representation of colors which are produced by means of a mixture of the primary colors is generated so that the image points are not represented on top of one another but instead are represented next to one another. FIGS. 4a through 4i represent a gray scale which is generated by the employment of three primary colors. In this example, the degree of coverage of all of the primary colors increases uniformly. The gray scale exhibits 10 gradations of which nine gray scales are illustrated. The tenth image spot for the white value, in which no raster position is occupied, is not illustrated in the Figs. The magenta image points are illustrated with downwardly inclined lines, the yellow image points are represented by upwardly inclined lines, and the cyan blue image points are represented by vertical lines. The raster positions are occupied with an increasing degree of coverage in accord with the sequence illustrated in FIG. 3.

For the image spots BG1, BG2 and BG3 in the first three gray scales, the image points with the primary colors are represented next to one another in the specified manner. For the image spot BG3, all raster positions are occupied by a respective image point. For the image spots BG4, BG5 and BG6, two vari-colored image points are successively represented at three respective raster positions. For the image spot BG6, two image points are represented on top of one another at each raster position. In an analagous manner, three vari-colored image points are represented on top of one another at three respective raster positions given a further increase in the degree of coverage for the image spots BG7, BG8 and BG9. For the image spot BG9, three vari-colored image points are represented on top of one another at each raster position.

For the image spots BG1 through BG3, the color impression is obtained by means of an optical mixture of the colors, whereas the color impression for the image spots BG4 through BG9 is produced by means of subtractive mixture of the primary colors.

It will be understood that the combination of nine raster positions forming an image spot is exemplary in nature only. It will be apparent to those skilled in the art that numerous possibilities exist for combining the image points into image spots. It is preferable, however, to always dispose the image point at corner points of polygons which are shifted with respect to each other within the image spots and to interchange the sequence by which the corners of the polygons are occupied by the image points of the various colors so that, insofar as possible, the image points are not printed on top of one another but are instead printed next to each other given low degrees of coverage.

Although other changes and modifications may be apparent to those skilled in the art, it is the intention of the inventor to embody within the patent warranted hereon all changes and modifications as reasonably and properly come within the scope of his contribution to the art.

I claim as my invention:

1. A method for representing polychromatic halftone images in a mosaic printing device comprising:
   printing a plurality of image points of equal size of different primary colors at prescribed raster positions on a recording medium,
   image points at selected raster positions being combined to form an image spot, the number of said image points of each primary color in said image spot determining the degree of coverage of a primary color in said image spot, and
   said raster positions being occupied by said image points in a sequence of increasing degree of coverage, said sequence in each image spot being the same for each primary color and being different for different primary colors.

2. The method of claim 1 wherein said sequence is further defined by occupying said image points in an image spot by a uniformly increasing degree of coverage for all primary colors by occupying said raster positions are occupied by n image points only when all raster positions have been previously occupied by n−1 image points, where n=2, 3, . . . .

3. The method of claim 1 wherein said raster positions are disposed such that each raster position has the same spacing from six adjacent raster positions.

4. The method of claim 1 wherein said image points have the primary colors magenta, yellow and cyan blue.

5. The method of claim 1 wherein said sequence by which said raster positions are occupied by image points in an image spot for an increasing degree of coverage of each primary color is further defined by occupying the corners of a polygon for each primary color, said polygon for each primary color being shifted with respect to the polygons for the other primary colors, and the corners of the polygon for each primary color being completed in a different sequence.

6. The method of claim 5 wherein each image spot contains 9 raster positions and wherein said polygons are three equilateral triangles shifted with respect to each other and wherein said raster positions are disposed at the corner points of said equilateral triangles, said equilateral triangles being respectively completed by image points corresponding to the primary colors by successive occupation of the corner points.

7. An apparatus for representing polychromatic halftone images by printing image points of different primary colors on a recording medium comprising:
   a mosaic ink printing head having a plurality of nozzles disposed in front of said recording medium including a means for ejecting ink droplets from said nozzles onto said recording medium for forming image points of equal size thereon;

a means for supplying ink of different primary colors to said plurality of nozzles; and a means for shifting said recording medium such that after a complete movement of said ink printing head in a primary direction said recording medium is shifted in a direction perpendicular to said printing direction by a distance which is one half of a width of an image point.

8. The apparatus of claim 7 wherein said printing head has 12 nozzles, said nozzles being divided into three groups of four nozzles, the nozzles in a group being disposed directed above and adjacent to each other, and all nozzles in a group ejecting one of the primary colors magenta, yellow, and cyan blue.

* * * * *